United States Patent
Yang

(10) Patent No.: US 11,124,643 B2
(45) Date of Patent: *Sep. 21, 2021

(54) THERMOPLASTIC RESIN COMPOSITION AND MOLDED ARTICLE MANUFACTURED THEREFROM

(71) Applicant: LOTTE CHEMICAL CORPORATION, Seoul (KR)

(72) Inventor: Yun Jeong Yang, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 153 days.

This patent is subject to a terminal disclaimer.

(21) Appl. No.: 16/466,346

(22) PCT Filed: Dec. 19, 2017

(86) PCT No.: PCT/KR2017/015048
§ 371 (c)(1),
(2) Date: Jun. 4, 2019

(87) PCT Pub. No.: WO2018/124594
PCT Pub. Date: Jul. 5, 2018

(65) Prior Publication Data
US 2020/0079951 A1 Mar. 12, 2020

(30) Foreign Application Priority Data
Dec. 27, 2016 (KR) ........................ 10-2016-0179614

(51) Int. Cl.
C08L 51/04 (2006.01)
C08K 3/013 (2018.01)
C08K 3/22 (2006.01)
C08K 5/00 (2006.01)
C08K 5/3435 (2006.01)
C08K 5/3475 (2006.01)
C08L 25/12 (2006.01)

(52) U.S. Cl.
CPC .............. C08L 51/04 (2013.01); C08K 3/013 (2018.01); C08K 3/22 (2013.01); C08K 5/005 (2013.01); C08K 5/3435 (2013.01); C08K 5/3475 (2013.01); C08L 25/12 (2013.01); C08K 2003/2296 (2013.01); C08K 2201/005 (2013.01); C08K 2201/006 (2013.01)

(58) Field of Classification Search
CPC ...................................................... C08L 51/04
See application file for complete search history.

(56) References Cited

U.S. PATENT DOCUMENTS 3,041,303 A 6/1962 Nelson
3,354,108 A 11/1967 Paradis et al.
4,331,786 A 5/1982 Foy et al.
4,356,300 A 10/1982 Isler et al.
4,612,340 A 9/1986 Ohachi
5,151,457 A 9/1992 Ishida et al.
5,714,534 A 2/1998 Kojima et al.
5,714,545 A 2/1998 Lee et al.
5,906,679 A 5/1999 Watanabe et al.
6,166,116 A 12/2000 Sleeckx
6,297,307 B1 10/2001 Eichenauer et al.
6,663,877 B1 12/2003 Appleton et al.
6,773,803 B2 8/2004 Lee et al.
6,893,739 B2 5/2005 Lee et al.
6,969,623 B1 9/2005 Kim et al.
7,128,973 B2 10/2006 Park
8,128,998 B2 3/2012 Li et al.
9,902,850 B2 2/2018 Kim et al.
2002/0106413 A1 8/2002 Herbst et al.
2002/0109805 A1 8/2002 Baba
2003/0125413 A1 7/2003 Herbst et al.
2005/0043485 A1 2/2005 Lee et al.
2005/0131100 A1 6/2005 Herbst et al.
2006/0247338 A1 11/2006 Klei et al.
2007/0009691 A1 1/2007 Barre et al.
2007/0049678 A1 3/2007 Kim et al.
2009/0166593 A1 2/2009 Kim et al.
(Continued)

FOREIGN PATENT DOCUMENTS

CN 1710153 A1 12/2005
CN 1919542 A 2/2007
(Continued)

OTHER PUBLICATIONS

English Machine Translation of JP2001220486 (A) Aug. 14, 2001 obtained Jan. 13, 2021 at: http://translationportal.epo.org/emtp/translate/?ACTION=description-retrieval&COUNTRY=JP&ENGINE=google&FORMAT=docdb&KIND=A&LOCALE=en_EP&NUMBER=2001220486&OPS=ops.epo.org/3.2&SRCLANG=ja&TRGLANG=en.*

(Continued)

Primary Examiner — Arrie L Reuther
(74) Attorney, Agent, or Firm — Additon, Pendleton & Witherspoon, P.A.

(57) ABSTRACT

A thermoplastic resin composition of the present invention is characterized by comprising: a thermoplastic resin containing an acrylate-based rubber-modified vinyl-based graft copolymer and an aromatic vinyl-based copolymer resin; an ultraviolet stabilizer containing a hindered amine light stabilizer (HALS)-based ultraviolet stabilizer and a benzotriazole-based ultraviolet stabilizer; and zinc oxide having an average particle size of about 0.5 to about 3 μm and a specific surface area BET of about 1 to about 10 m²/g. The thermoplastic resin composition has excellent weather resistance and antibacterial properties.

12 Claims, No Drawings

(56) References Cited

U.S. PATENT DOCUMENTS

| | | |
|---|---|---|
| 2009/0274896 A1 | 11/2009 | Takeshi et al. |
| 2010/0264383 A1 | 10/2010 | Tooley et al. |
| 2011/0015297 A1 | 1/2011 | Destro et al. |
| 2014/0017335 A1 | 1/2014 | Dimov et al. |
| 2015/0284559 A1 | 10/2015 | Tai |
| 2016/0319128 A1 | 11/2016 | Park et al. |
| 2016/0326670 A1 | 11/2016 | Kang et al. |
| 2017/0198132 A1 | 7/2017 | Choi et al. |
| 2018/0112056 A1 | 4/2018 | Yang et al. |
| 2018/0118914 A1 | 5/2018 | Bae et al. |
| 2018/0179314 A1 | 6/2018 | Kim et al. |
| 2018/0179373 A1 | 6/2018 | Kim et al. |
| 2018/0186989 A1 | 7/2018 | Lee et al. |
| 2019/0299572 A1 | 10/2019 | Hirabayashi |
| 2020/0056008 A1 | 2/2020 | Kim et al. |

FOREIGN PATENT DOCUMENTS

| | | |
|---|---|---|
| CN | 101001805 A | 7/2007 |
| CN | 101880426 A | 11/2010 |
| CN | 107974030 A | 5/2018 |
| EP | 1190622 A1 | 3/2002 |
| EP | 1510549 A1 | 3/2005 |
| EP | 3026082 A1 | 6/2016 |
| EP | 3326975 A1 | 5/2018 |
| EP | 3339367 A1 | 6/2018 |
| EP | 3339370 A1 | 6/2018 |
| EP | 3342817 A1 | 7/2018 |
| FR | 1439417 A | 5/1966 |
| GB | 1040287 A | 8/1966 |
| JP | 55-133424 A | 10/1980 |
| JP | 56-045419 A | 4/1981 |
| JP | 63-278951 A | 11/1988 |
| JP | 06-287547 A1 | 10/1994 |
| JP | 06-329854 A | 11/1994 |
| JP | 08-253640 A | 10/1996 |
| JP | 09-157512 A | 6/1997 |
| JP | 10-182927 A | 7/1998 |
| JP | H10195309 A | 7/1998 |
| JP | 10-2514-44 A | 9/1998 |
| JP | 11-035787 A | 2/1999 |
| JP | 11-263705 A | 9/1999 |
| JP | 2001-220464 A | 8/2001 |
| JP | 2001-220486 A | 8/2001 |
| JP | 2001220486 A * | 8/2001 |
| JP | 2006-182841 A1 | 7/2006 |
| JP | 2008-065142 A | 3/2008 |
| JP | 2008-540731 A | 11/2008 |
| JP | 2009-91400 A | 4/2009 |
| JP | 2009-161758 A | 7/2009 |
| JP | 2014-172783 A | 9/2014 |
| JP | 2014-221708 A | 11/2014 |
| JP | 2016-121273 A | 7/2016 |
| KR | 10-2002-0008203 A | 1/2002 |
| KR | 10-2005-0025186 A | 3/2005 |
| KR | 10-0696385 B1 | 3/2007 |
| KR | 10-2007-0047073 A | 5/2007 |
| KR | 10-0833453 B1 | 5/2008 |
| KR | 10-2010-0087603 A | 8/2010 |
| KR | 10-1452020 A | 6/2012 |
| KR | 10-1292164 B1 | 8/2013 |
| KR | 10-1334283 B1 | 11/2013 |
| KR | 10-2014-0045782 A | 4/2014 |
| KR | 10-1452020 B1 | 10/2014 |
| KR | 10-2016-0083527 A | 7/2016 |
| KR | 10-2016-129746 A | 11/2016 |
| KR | 10-2016-0001572 A | 9/2017 |
| WO | 02/49985 A1 | 6/2002 |
| WO | 2014/084453 A1 | 6/2014 |
| WO | 2015/097106 A1 | 7/2015 |
| WO | 2018/117473 A1 | 6/2018 |
| WO | 2018/124594 A1 | 7/2018 |

OTHER PUBLICATIONS

English Machine Translation of JPH11263705 (A)—Sep. 28, 1999 obtained Jan. 13, 2021 at: http://translationportal.epo.org/emtp/translate/?ACTION=claims-retrieval&COUNTRY=JP&ENGINE=google&FORMAT=docdb&KIND=A&LOCALE=en_EP&NUMBER=H11263705&OPS=ops.epo.org/3.2&SRCLANG=ja&TRGLANG=en.*

Extended Search Report in counterpart European Application No. 17888521.6 dated Jul. 10, 2020, pp. 1-6.

International Search Report in counterpart International Application No. PCT/KR20171015048 dated Apr. 16, 2018, pp. 1-4.

Search Report in commonly owned European Application No. 17210669.2 dated Apr. 20, 2018, pp. 1-5.

Extended Search Report in commonly owned European Application No. 17209267.8 dated Mar. 26, 2018, pp. 1-7.

Extended Search Report in commonly owned European Application No. 17198304.2 dated Mar. 12, 2018, pp. 1-5.

Office Action in commonly owned U.S. Appl. No. 15/790,334 dated Apr. 16, 2019, pp. 1-18.

Chandrakanth et al., "Synthesis and characterization of ZnO nanorods with a narrow size distribution", Royal Society of Chemistry, 2015, vol. 5, pp. 49861-49870 (17 pages).

Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.

Machine translated English language equivalent of CN 101880426 (2010, 5 pages).

Machine translated English language equivalent of JP 2014-221708 (2014, 9 pages).

Extended Search Report in commonly owned European Application No. 17199720.8 dated Mar. 7, 2018, pp. 1-7.

Database WPI, Week 201463, Thomson Scientific, London, GB, Abstract of JP 2014-172783 (UBE Kagaku Kogyo KK), pp. 1-2.

Database WPI, Week 201654, Thomson Scientific, London, GB, Abstract of KR 2016-0083527 (Kolon Plastics Inc.), pp. 1-2.

Office Action in commonly owned U.S. Appl. No. 15/844,980 dated Sep. 11, 2019, pp. 1-5.

Machine translated English language equivalent of H09-061580, which is the same as JP Publication JP 10-251444 (1998, 14 pages).

Final Office Action in commonly owned U.S. Appl. No. 15/844,980 dated Mar. 10, 2020, pp. 1-10.

Google translation of JP 11035787 (1999, 8 pages).

Google translation of JP 06287547 (1994, 5 pages).

Office Action in commonly owned U.S. Appl. No. 15/798,819 dated May 13, 2019, pp. 1-20.

Extended Search Report in commonly owned European Application No. 17210117.2, dated Apr. 30, 2018, pp. 1-5.

Prasanna et al., "Insight into the Mechanism of Antibacterial Activity of ZnO: Surface Defects Mediated Reactive Oxygen Species Even in the Dark" Langmuir 2015, vol. 31, Jul. 29, 2015, pp. 9155-9162.

Machine translated English language equivalent of CN 1919542 (2007, 5 pages).

Machine translated English language equivalent of JP Application No. H09-212736, which is the same as publication JP 11-035787 (1999, 10 pages).

International Search Report in commonly owned International Application No. PCT/KR2017/013955 dated Feb. 22, 2018, pp. 1-4.

Padmavathy, N. et al., "Enhanced bioactivity of ZnO nanoparticles-an antimicrobial study", Science and Technology of Advanced Materials, Sep. 1, 2008, vol. 9, No. 3, p. 35004 (7pp).

Office Action in commonly owned U.S. Appl. No. 15/845,020 dated Aug. 8, 2019, pp. 1-13.

Office Action in commonly owned U.S. Appl. No. 16/347,929 dated Jan. 27, 2021, pp. 1-15.

Office Action in commonly owned U.S. Appl. No. 16/347,929 dated Aug. 11, 2021, pp. 1-15.

Benhebal et al., "Photocatalytic degradation of phenol and benzoic acid using zinc oxide powders prepared by the sol-gel process", Alexandria Engineering Journal, (2013) 52, 517-523.

(56) References Cited

OTHER PUBLICATIONS

Kolodziejczak-Radzimska et al., "Zinc Oxide—From Synthesis to Application: A Review" Materials (2014), 7, 2833-2881; doi:10.3390/ma7042833.

* cited by examiner

THERMOPLASTIC RESIN COMPOSITION AND MOLDED ARTICLE MANUFACTURED THEREFROM

CROSS-REFERENCE TO RELATED APPLICATIONS

This application claims priority to and the benefit of International Application No. PCT/KR2017/015048, filed Dec. 19, 2017, which published as WO 2018/124594 on Jul. 5, 2018; and Korean Patent Application No. 10-2016-0179614 filed in the Korean Intellectual Property Office on Dec. 27, 2016, the entire disclosure of each of which is incorporated herein by reference.

TECHNICAL FIELD

The present invention relates to a thermoplastic resin composition and a molded article manufactured therefrom. More particularly, the present invention relates to a thermoplastic resin composition that exhibits good properties in terms of weather resistance, antibacterial properties, and the like, and a molded article manufactured therefrom.

BACKGROUND ART

An acrylate-based rubber-modified aromatic vinyl copolymer resin such as an acrylonitrile-styrene-acrylonitrile copolymer resin (ASA resin) has better weather resistance (discoloration resistance) than a diene-based rubber-modified aromatic vinyl copolymer resin such as an acrylonitrile-butadiene-styrene copolymer resin (ABS resin) and is used for interior/exterior materials for electric/electronic products and automobiles, exterior materials for buildings, and the like, which require weather resistance.

However, since use of such an acrylate-based rubber-modified aromatic vinyl copolymer resin alone has a limitation in improvement of weather resistance (discoloration resistance), a weather stabilizer such as a UV stabilizer is added to achieve a desired degree of weather resistance. However, since an excess of the weather stabilizer can cause deterioration in external appearance and mechanical properties due to out-gassing, increase in amount of the weather stabilizer is not preferred.

Moreover, a molded article produced from a thermoplastic resin is required to have antibacterial properties when used for application entailing direct or indirect body contact.

Therefore, there is a need for development of a thermoplastic resin composition exhibiting good properties in terms of weather resistance, antibacterial properties, and the like without deterioration in properties of a thermoplastic resin.

The background technique of the present invention is disclosed in Korean Patent No. 1452020 and the like.

DISCLOSURE

Technical Problem

It is one object of the present invention to provide a thermoplastic resin composition exhibiting good properties in terms of weather resistance, antibacterial properties, and the like.

It is another object of the present invention to provide a molded article formed of the thermoplastic resin composition.

The above and other objects of the present invention can be achieved by the present invention described below.

Technical Solution

One aspect of the present invention relates to a thermoplastic resin composition. The thermoplastic resin composition includes: a thermoplastic resin including an acrylate-based rubber-modified vinyl graft copolymer and an aromatic vinyl copolymer resin; an ultraviolet (UV) stabilizer including an HALS (hindered amine light stabilizer)-based UV stabilizer and a benzotriazole-based UV stabilizer; and zinc oxide having an average particle diameter of about 0.5 μm to about 3 μm and a BET specific surface area of about 1 m$^2$/g to about 10 m$^2$/g.

In one embodiment, the thermoplastic resin composition may include: about 100 parts by weight of the thermoplastic resin including about 20 wt % to about 50 wt % of the acrylate-based rubber-modified vinyl graft copolymer and about 50 wt % to about 80 wt % of the aromatic vinyl copolymer resin; about 0.05 to about 2 parts by weight of the HALS-based UV stabilizer; about 0.05 to about 2 parts by weight of the benzotriazole-based UV stabilizer; and about 0.1 to about 5 parts by weight of the zinc oxide.

In one embodiment, the acrylate-based rubber-modified vinyl graft copolymer may be prepared by graft copolymerization of a monomer mixture comprising an aromatic vinyl monomer and a vinyl cyanide monomer to an acrylate-based rubber polymer.

In one embodiment, the aromatic vinyl copolymer resin may be a polymer of an aromatic vinyl monomer and a monomer copolymerizable with the aromatic vinyl monomer.

In one embodiment, the HALS-based UV stabilizer may include at least one selected from among bis(2,2,6,6-tetramethyl-4-piperidyl)sebacate and bis(2,2,6,6-tetramethyl-2-piperidyl)sebacate.

In one embodiment, the benzotriazole-based UV stabilizer may include at least one selected from among 2-(2H-benzotriazole-2-yl)-4-(1,2,3,3-tetramethylbutyl)phenol, 2-(2-hydroxy-5-methyl-phenyl)benzotriazole, 2-(2H-benzotriazole-2-yl)-4-(1,1,3,3-tetramethylbutyl)phenol, and 2-(5-chloro-2H-benzotriazole-2-yl)-4,6-bis(1,1-dimethylethyl)phenol.

In one embodiment, the zinc oxide may have a peak intensity ratio (B/A) of about 0 to about 1, where A indicates a peak in the wavelength range of 370 nm to 390 nm and B indicates a peak in the wavelength range of 450 nm to 600 nm in photoluminescence measurement.

In one embodiment, the zinc oxide may have a peak position (2θ) in the range of 35° to 37° and a crystallite size of about 1,000 Å to about 2,000 Å, in X-ray diffraction (XRD) analysis, as calculated by Equation 1:

$$\text{Crystallite size}(D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

In one embodiment, the HALS-based UV stabilizer and the benzotriazole-based UV stabilizer may be present in a weight ratio (HALS-based UV stabilizer:benzotriazole-based UV stabilizer) of about 1:0.5 to about 1:1.1.

In one embodiment, the UV stabilizer and the zinc oxide may be present in a weight ratio (UV stabilizer:zinc oxide) of about 1:0.5 to about 1:10.

In one embodiment, the thermoplastic resin composition may have a color variation (ΔE) of about 0.5 to about 2.5, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after testing for 3,000 hours in accordance with ASTM D4459.

$$\text{Color variation } (\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

In one embodiment, the thermoplastic resin composition may have an antibacterial activity of about 2 to about 7 against *Staphylococcus aureus* and an antibacterial activity of about 2 to about 7 against *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801, and calculated according to Equation 3.

$$\text{Antibacterial activity} = \log(M1/M2) \quad \text{[Equation 3]}$$

where M1 is the number of bacteria as measured on a blank specimen after incubation for 24 hours and M2 is the number of bacteria as measured on a specimen of the thermoplastic resin composition after incubation for 24 hours.

Another aspect of the present invention relates to a molded article. The molded article may be formed of the thermoplastic resin composition as set forth above.

Advantageous Effects

The present invention provides a thermoplastic resin composition that has good properties in terms of weather resistance, antibacterial properties, and the like, and a molded article formed of the same.

BEST MODE

Hereinafter, embodiments of the present invention will be described in detail.

A thermoplastic resin composition according to the present invention includes (A) a thermoplastic resin including (A1) a rubber-modified vinyl graft copolymer and (A2) an aromatic vinyl copolymer resin; (B) a UV stabilizer including (B1) an HALS (hindered amine light stabilizer) based UV stabilizer and (B2) a benzotriazole-based UV stabilizer; and (C) zinc oxide.

(A) Thermoplastic Resin

According to the present invention, the thermoplastic resin may be an acrylate-based rubber-modified vinyl copolymer resin including the (A1) acrylate-based rubber-modified vinyl graft copolymer and the (A2) aromatic vinyl copolymer resin.

(A1) Acrylate-Based Rubber-Modified Aromatic Vinyl Graft Copolymer

According to one embodiment of the invention, the acrylate-based rubber-modified vinyl graft copolymer serves to improve weather resistance, impact resistance, and chemical resistance of the thermoplastic resin composition, and may be prepared by graft polymerization of a monomer mixture comprising an aromatic vinyl monomer and a vinyl cyanide monomer to an acrylate-based rubber polymer. For example, the acrylate-based rubber-modified vinyl graft copolymer may be prepared by graft polymerization of the monomer mixture comprising the aromatic vinyl monomer and the vinyl cyanide monomer to the acrylate-based rubber polymer, in which the monomer mixture may further include a monomer for imparting processability and heat resistance, as needed. Here, polymerization may be performed by any typical polymerization method, such as emulsion polymerization, suspension polymerization, and the like. In addition, the acrylate-based rubber-modified vinyl graft copolymer may form a core (rubber polymer)-shell (copolymer of the monomer mixture) structure, without being limited thereto.

Examples of the acrylate-based rubber polymer may include an alkyl (meth)acrylate rubber, and a copolymer of an alkyl (meth)acrylate and an aromatic vinyl compound. These may be used alone or as a mixture thereof. For example, the acrylate-based rubber polymer may include a $C_2$ to $C_{10}$ alkyl acrylate rubber, a copolymer of a $C_2$ to $C_{10}$ alkyl acrylate and styrene, and a combination thereof, specifically butyl acrylate rubber, a copolymer of butyl acrylate and styrene, and a combination thereof. Here, the copolymer of the alkyl (meth)acrylate and the aromatic vinyl compound may be prepared by copolymerization of about 70 wt % to about 90 wt % of the alkyl (meth)acrylate and about 10 wt % to about 30 wt % of the aromatic vinyl compound, without being limited thereto.

In some embodiments, the acrylate-based rubber polymer (rubber particles) may have an average particle diameter (Z-average) of about 0.1 μm to about 0.5 μm, for example, about 0.15 μm to about 0.4 μm. Within this range, the thermoplastic resin composition can exhibit good properties in terms of weather resistance, impact resistance, chemical resistance, and the like.

In some embodiments, the acrylate-based rubber polymer may be a mixture of acrylate-based rubber polymers having different average particle diameters. For example, the acrylate-based rubber polymer may be a mixture of about 40 wt % to about 80 wt % of a first acrylate-based rubber polymer having an average particle diameter of about 0.1 μm to about 0.2 μm and about 20 wt % to about 60 wt % of a second acrylate-based rubber polymer having an average particle diameter of greater than about 0.2 μm to about 0.5 μm or less, in which the mixture of the first and second acrylate-based rubber polymers has a bimodal particle size distribution, without being limited thereto. With the mixture of the acrylate-based rubber polymers, the thermoplastic resin composition can have uniform impact resistance.

In some embodiments, the acrylate-based rubber polymer may be present in an amount of about 20 wt % to about 70 wt %, for example, about 30 wt % to about 60 wt %, based on 100 wt % of the acrylate-based rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on 100 wt % of the acrylate-based rubber-modified vinyl graft copolymer. Within these ranges, the thermoplastic resin composition can exhibit good properties in terms of weather resistance, impact resistance, chemical resistance, and the like.

In some embodiments, the aromatic vinyl monomer is a monomer graft-polymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can exhibit good properties in terms of formability, impact resistance, and the like.

In some embodiments, the vinyl cyanide monomer is copolymerizable with the aromatic vinyl monomer and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

Examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the acrylate-based rubber-modified vinyl graft copolymer may be an acrylate-styrene-acrylonitrile graft copolymer (g-ASA), without being limited thereto.

In some embodiments, the acrylate-based rubber-modified vinyl graft copolymer may be present in an amount of about 20 wt % to about 50 wt %, for example, about 25 wt % to about 45 wt %, based on 100 wt % of the thermoplastic resin (including the acrylate-based rubber-modified vinyl graft copolymer and the aromatic vinyl copolymer resin). Within this range, the thermoplastic resin composition can exhibit good properties in terms of weather resistance, impact resistance, fluidity (molding processability), external appearance, and balance therebetween.

(A2) Aromatic Vinyl Copolymer Resin

According to the embodiment of the invention, the aromatic vinyl copolymer resin may be an aromatic vinyl copolymer resin used for a typical rubber-modified vinyl copolymer resin. For example, the aromatic vinyl copolymer resin may be a polymer of a monomer mixture comprising an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

Examples of the aromatic vinyl monomer may include styrene, α-methylstyrene, β-methylstyrene, β-methylstyrene, β-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may include, for example, acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile, methacrylonitrile, and the like may be used. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, formability, and the like.

In some embodiments, the aromatic vinyl copolymer resin may be present in an amount of about 50 wt % to about 80 wt %, for example, about 55 wt % to about 75 wt %, based on 100 wt % of the thermoplastic resin. Within this range, the thermoplastic resin composition can exhibit good properties in terms of impact resistance, fluidity (molding processability), and the like.

(B) UV Stabilizer

The UV stabilizer according to the embodiment of the present invention serves to improve weather resistance, antibacterial properties and the like together with zinc oxide and includes (B1) an HALS (hindered amine light stabilizer)-based UV stabilizer and (B2) a benzotriazole-based UV stabilizer.

(B1) HALS-Based UV Stabilizer

According to one embodiment of the invention, the HALS-based UV stabilizer may include bis(2,2,6,6-tetramethyl-4-piperidyl)sebacate, bis(2,2,6,6-tetramethyl-2-piperidyl)sebacate, and a combination thereof.

In some embodiments, the HALS-based UV stabilizer may be present in an amount of about 0.05 to about 2 parts by weight, for example, about 0.1 to about 1 part by weight, specifically about 0.2 to about 0.6 parts by weight, relative to 100 parts by weight of the thermoplastic resin. Within this range, the thermoplastic resin composition can exhibit good properties in terms of weather resistance, antibacterial properties, and the like.

(B2) Benzotriazole-Based UV Stabilizer

According to one embodiment of the invention, the benzotriazole-based UV stabilizer may include 2-(2H-benzotriazole-2-yl)-4-(1,2,3,3-tetramethylbutyl)phenol, 2-(2-hydroxy-5-methyl-phenyl)benzotriazole, 2-(2H-benzotriazole-2-yl)-4-(1,1,3,3-tetramethylbutyl)phenol, 2-(5-chloro-2H-benzotriazole-2-yl)-4,6-bis(1,1-dimethylethyl)phenol, and a combination thereof. Preferably, 2-(2H-benzotriazole-2-yl)-4-(1,2,3,3-tetramethylbutyl)phenol is used.

In some embodiments, the benzotriazole-based UV stabilizer may be present in an amount of about 0.05 to about 2 parts by weight, for example, about 0.1 to about 1 part by weight, specifically about 0.1 to about 0.5 parts by weight, relative to about 100 parts by weight of the thermoplastic resin. Within this range, the thermoplastic resin composition can exhibit good properties in terms of weather resistance, antibacterial properties, and the like.

In some embodiments, the HALS-based UV stabilizer (B1) and the benzotriazole-based UV stabilizer (B2) may be present in a weight ratio (B1:B2) of about 1:0.5 to about 1:1.1, for example, about 1:0.6 to about 1:1. Within this range, the thermoplastic resin composition can exhibit good properties in terms of weather resistance, antibacterial properties, and the like.

(C) Zinc Oxide

According to the present invention, the zinc oxide serves to improve weather resistance and antibacterial properties of the thermoplastic resin composition together with the UV stabilizer, and may have an average particle diameter (D50) of about 0.5 μm to about 3 μm, for example, about 1 μm to about 3 μm, as measured using a particle size analyzer, a BET specific surface area of about 1 $m^2/g$ to about 10 $m^2/g$, for example, about 1 $m^2/g$ to about 7 $m^2/g$, and a purity of about 99% or higher. Within this range, the thermoplastic resin composition can exhibit good properties in terms of weather resistance, antibacterial properties, and the like.

In some embodiments, the zinc oxide may have a peak intensity ratio (B/A) of about 0 to about 1, for example, about 0.1 to about 1, where A indicates a peak in the wavelength range of 370 nm to 390 nm and B indicates a peak in the wavelength range of 450 nm to 600 nm in photoluminescence measurement. Within this range, the thermoplastic resin composition can have further improved properties in terms of weather resistance, antibacterial properties, and the like.

In some embodiments, the zinc oxide may have a peak position degree (2θ) in the range of 35° to 37° and a crystallite size of about 1,000 Å to about 2,000 Å, for example, about 1,200 Å to about 1,800 Å, in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, weather resistance, antibacterial properties, and the like.

$$\text{Crystallite size}(D) = \frac{K\lambda}{\beta\cos\theta} \quad \text{[Equation 1]}$$

where K is a shape factor, λ is an X-ray wavelength, β is an FWHM value (degree), and θ is a peak position degree.

In some embodiments, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, and cooling the reactor to about 20° C. to about 30° C., followed by heating the reactor to about 700° C. to about 800° C. for about 30 min to about 150 min while injecting nitrogen/hydrogen gas into the reactor, as needed, and cooling the reactor to room temperature (about 20° C. to about 30° C.)

In some embodiments, the zinc oxide may be present in an amount of about 0.1 to about 5 parts by weight, for example, about 0.5 to about 4 parts by weight, relative to about 100 parts by weight of the thermoplastic resin. Within this range, the thermoplastic resin composition can have further improved properties in terms of weather resistance, antibacterial properties, and the like.

In some embodiments, the UV stabilizer (B) and the zinc oxide (C) may be present in a weight ratio (B:C) of about 1:0.5 to about 1:10, for example, about 1:0.6 to about 1:10. Within this range, the thermoplastic resin composition can have further improved properties in terms of weather resistance, antibacterial properties, and the like.

According to one embodiment of the invention, the thermoplastic resin composition may further include additives used in typical thermoplastic resin compositions. Examples of the additives may include a flame retardant, fillers, an antioxidant, an anti-dripping agent, a lubricant, a release agent, a nucleating agent, an antistatic agent, a stabilizer, a pigment, a dye, and a mixture thereof, without being limited thereto. The additives may be present in an amount of about 0.001 to about 40 parts by weight, for example, about 0.1 to about 10 parts by weight, relative to about 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 250° C.

In some embodiments the thermoplastic resin composition may have a color variation (ΔE) of about 0.5 to about 2.5, for example, about 0.6 to about 1.5, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after testing for 3,000 hours in accordance with ASTM D4459.

$$\text{Color variation }(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after weather resistance testing, Δa* is a difference ($a_1^* - a_0^*$) between a* values before and after weather resistance testing, and Δb* is a difference ($b_1^* - b_0^*$) between b* values before and after weather resistance testing.

In some embodiments, the thermoplastic resin composition may have an antibacterial activity of about 2 to about 7, for example, about 4 to about 7, against *Staphylococcus aureus* and an antibacterial activity of about 2 to about 7, for example, about 3 to 7, against *Escherichia coli*, as measured on 5 cm×5 cm specimens after inoculation with *Staphylococcus aureus* and *Escherichia coli*, respectively, and culturing under conditions of 35° C. and 90% RH for 24 hours, in accordance with JIS Z 2801, and calculated according to Equation 3.

$$\text{Antibacterial activity} = \log(M1/M2) \quad \text{[Equation 3]}$$

where M1 is the number of bacteria as measured on a blank specimen after for 24 hours and M2 is the number of bacteria as measured on a specimen of the thermoplastic resin composition after incubation for 24 hours.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles exhibit good properties in terms of weather resistance, antibacterial properties, impact resistance, fluidity (molding processability), and balance therebetween, and thus may be used for interior/exterior materials for electric/electronic products, for example, interior/exterior materials for washing machines, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Thermoplastic Resin

An acrylate-based rubber-modified vinyl copolymer resin comprising 40 wt % of (A1) an acrylate-based rubber-modified aromatic vinyl graft copolymer and 60 wt % of (A2) an aromatic vinyl copolymer resin was used.

(A1) Acrylate-based rubber-modified aromatic vinyl graft copolymer

A g-ASA copolymer obtained by grafting 55 wt % of a mixture comprising styrene and acrylonitrile (weight ratio: 75/25) to 45 wt % of butyl acrylate rubber having a Z-average particle diameter of 310 nm was used.

(A2) Aromatic Vinyl Copolymer Resin (A2-1) An SAN resin (weight average molecular weight: 130,000 g/mol) obtained through polymerization of 70 wt % of styrene and 30 wt % of acrylonitrile was used.

(B) UV Stabilizer (B1) As an HALS-based UV stabilizer, bis(2,2,6,6-tetramethyl-4-piperidyl)sebacate was used.

(B2) As a benzotriazole-based UV stabilizer, 2-(2H-benzotriazole-2-yl)-4-(1,2,3,3-tetramethylbutyl)phenol was used.

(B3) 2-(4,6-diphenyl-1,3,5-triazine-2-yl)-5-hexyloxylphenol was used.

(C) Zinc Oxide (C1) Zinc oxide having an average particle diameter, a BET surface area, a purity, and a peak intensity ratio (B/A) of peak B in the wavelength range of 450 nm to 600 nm to peak A in the wavelength range of 370 nm to 390 nm in photoluminescence measurement, and a crystallite size as listed in Table 1 was used.

(C2) Zinc oxide having an average particle diameter, a BET surface area, a purity, and a peak intensity ratio (B/A) of peak B in the wavelength range of 450 nm to 600 nm to peak A in the wavelength range of 370 nm to 390 nm in photoluminescence measurement, and a crystallite size as listed in Table 1 was used.

(C3) Zinc oxide having an average particle diameter, a BET surface area, a purity, and a peak intensity ratio (B/A) of peak B in the wavelength range of 450 nm to 600 nm to peak A in the wavelength range of 370 nm to 390 nm in photoluminescence measurement, and a crystallite size as listed in Table 1 was used.

TABLE 1

| | (C1) | (C2) | (C3) |
|---|---|---|---|
| Average particle diameter (μm) | 0.6 | 1.1 | 1.1 |
| BET surface area (m$^2$/g) | 6 | 40 | 15 |
| Purity (%) | 99 | 96 | 99 |

TABLE 1-continued

| | (C1) | (C2) | (C3) |
|---|---|---|---|
| PL peak intensity ratio (B/A) | 0.28 | 1.17 | 6.49 |
| Crystallite size (Å) | 1,467 | 141 | 1,027 |

Property Measurement (1) Average particle diameter (unit: μm): Average particle diameter was measured using a particle size analyzer (Laser Diffraction Particle size analyzer LS 13 320, Beckman Coulter Co., Ltd.).

(2) BET surface area (unit: m$^2$/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He-Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PROMRD, X'pert Co., Ltd.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size}(D) = \frac{K\lambda}{\beta\cos\theta} \quad \text{[Equation 2]}$$

where K is a shape factor, λ is an X-ray wavelength, β is an FWHM value (degree), and θ is a peak position degree.

Examples 1 to 5 and Comparative Examples 1 to 7

The above components were weighed in amounts as listed in Tables 2 and 3, and subjected to extrusion at 230° C., thereby preparing pellets. Extrusion was performed using a twin-screw extruder (L/D=36, Φ: 45 mm). The prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Tables 2 and 3.

Property Evaluation (1) Weather resistance (color variation (ΔE)): For determination of color variation, initial color values $L_0^*$, $a_0^*$ and $b_0^*$ were measured on an injection molded specimen having a size of 50 mm×90 mm×3 mm using a colorimeter (CM- 3700A, KONICA MINOLTA) and was then subjected to weather resistance testing for 3,000 hours in accordance with ASTM D4459, followed by measurement of color values $L_1^*$, $a_1^*$ and $b_1^*$ of the specimen using the colorimeter. Thereafter, a color variation (ΔE) was calculated according to Equation 2.

$$\text{Color variation } (\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after testing, Δa* is a difference ($a_1^* - a_0^*$) between a* values before and after testing, and Δb* is a difference ($b_1^* - b_0^*$) between b* values before and after testing.

(2) Antibacterial activity: Antibacterial activity was measured on 5 cm×5 cm specimens obtained by inoculation with *Staphylococcus aureus* and *Escherichia coli*, respectively, and culturing under conditions of 35° C. and 90% RH for 24 hours, in accordance with JIS Z 2801, and calculated according to Equation 3.

$$\text{Antibacterial activity} = \log(M1/M2), \quad \text{[Equation 3]}$$

where M1 is the number of bacteria as measured on a blank specimen after for 24 hours and M2 is the number of bacteria as measured on a specimen of the thermoplastic resin composition after incubation for 24 hours.

TABLE 2

|  |  | Example |  |  |  |  |
|---|---|---|---|---|---|---|
|  |  | 1 | 2 | 3 | 4 | 5 |
| (A) (parts by weight) |  | 100 | 100 | 100 | 100 | 100 |
| (B) (parts by weight) | (B1) | 0.5 | 1 | 0.1 | 0.5 | 0.5 |
|  | (B2) | 0.3 | 1 | 0.1 | 0.3 | 0.3 |
|  | (B3) | — | — | — | — | — |
| (C) (parts by weight) | (C1) | 2 | 2 | 2 | 4 | 0.5 |
|  | (C2) | — | — | — | — | — |
|  | (C3) | — | — | — | — | — |
| Color variation (ΔE) |  | 1.22 | 1.02 | 1.44 | 0.98 | 1.22 |
| Antibacterial activity (*Staphylococcus aureus*) |  | 6 | 6 | 6 | 6 | 4 |
| Antibacterial activity (*Escherichia coli*) |  | 4 | 4 | 4 | 4 | 3 |

TABLE 3

|  |  | Comparative Example |  |  |  |  |  |  |
|---|---|---|---|---|---|---|---|---|
|  |  | 1 | 2 | 3 | 4 | 5 | 6 | 7 |
| (A) (parts by weight) |  | 100 | 100 | 100 | 100 | 100 | 100 | 100 |
| (B) (parts by weight) | (B1) | — | 0.8 | 0.5 | 0.5 | 0.5 | 0.5 | — |
|  | (B2) | 0.8 | — | 0.3 | 0.3 | 0.3 | — | 0.3 |
|  | (B3) | — | — | — | — | — | 0.3 | 0.5 |
| (C) (parts by weight) | (C1) | 2 | 2 | — | — | — | 2 | 2 |
|  | (C2) | — | — | 2 | — | — | — | — |
|  | (C3) | — | — | — | 2 | — | — | — |
| Color variation (ΔE) |  | 3.2 | 3.8 | 1.22 | 1.24 | 3.4 | 3.4 | 3.6 |
| Antibacterial activity (*Staphylococcus aureus*) |  | 6 | 6 | 1 | 1 | 1 | 6 | 6 |
| Antibacterial activity (*Escherichia coli*) |  | 4 | 4 | 1 | 1 | 1 | 4 | 4 |

From the result, it can be seen that the thermoplastic resin composition according to the present invention has good properties in terms of weather resistance, antibacterial properties, and the like.

Conversely, the compositions of Comparative Examples 1 and 2 respectively prepared without using the HALS-based UV stabilizer (B1) and the benzotriazole-based UV stabilizer (B2) suffered from deterioration in weather resistance; the compositions of Comparative Examples 3 and 4 prepared using the zinc oxide (C2) and (C3) instead of the zinc oxide (C1) of the present invention suffered from deterioration in antibacterial properties and the like; and the composition of Comparative Example 5 free from zinc oxide suffered from deterioration in antibacterial properties and weather resistance. In addition, the compositions of Comparative Examples 6 and 7 prepared using the UV stabilizer (B3) instead of the HALS-based UV stabilizer (B1) and the benzotriazole-based UV stabilizer (B2) suffered from deterioration in weather resistance.

It should be understood that various modifications, changes, alterations, and equivalent embodiments can be made by those skilled in the art without departing from the spirit and scope of the present invention.

The invention claimed is:

1. A thermoplastic resin composition comprising:
    about 100 parts by weight of a thermoplastic resin comprising about 20 wt % to about 50 wt % of an acrylate-based rubber-modified vinyl graft copolymer and about 50 wt % to about 80 wt % of an aromatic vinyl copolymer resin;
    an ultraviolet (UV) stabilizer comprising about 0.05 to about 2 parts by weight of an HALS (hindered amine light stabilizer)-based UV stabilizer and about 0.05 to about 2 parts by weight of a benzotriazole-based UV stabilizer; and
    about 0.1 to about 5 parts by weight of zinc oxide having an average particle diameter of about 0.5 μm to about 3 μm, a BET specific surface area of about 1 m²/g to about 10 m²/g, a peak position (2θ) in the range of 35° to 37° and a crystallite size of about 1,000 Å to about 2,000 Å in X-ray diffraction (XRD) analysis as calculated by Equation 1:

$$\text{Crystallite size}(D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

2. The thermoplastic resin composition according to claim 1, wherein the acrylate-based rubber-modified vinyl graft copolymer is prepared by graft copolymerization of a monomer mixture comprising an aromatic vinyl monomer and a vinyl cyanide monomer to an acrylate-based rubber polymer.

3. The thermoplastic resin composition according to claim 1, wherein the aromatic vinyl copolymer resin is a polymer of an aromatic vinyl monomer and a monomer copolymerizable with the aromatic vinyl monomer.

4. The thermoplastic resin composition according to claim 1, wherein the HALS-based UV stabilizer comprises bis(2,2,6,6-tetramethyl-4-piperidyl)sebacate and/or bis(2,2,6,6-tetramethyl-2-piperidyl)sebacate.

5. The thermoplastic resin composition according to claim 1, wherein the benzotriazole-based UV stabilizer comprises 2-(2H-benzotriazole-2-yl)-4-(1,2,3,3-tetramethylbutyl)phenol, 2-(2-hydroxy-5-methyl-phenyl)benzotriazole, 2-(2H-benzotriazole-2-yl)-4-(1,1,3,3-tetramethylbutyl)phenol, and/or 2-(5-chloro-2H-benzotriazole-2-yl)-4,6-bis(1,1-dimethylethyl)phenol.

6. The thermoplastic resin composition according to claim 1, wherein the zinc oxide has a peak intensity ratio (B/A) of about 0 to about 1, where A indicates a peak in the wavelength range of 370 nm to 390 nm and B indicates a peak in the wavelength range of 450 nm to 600 nm in photoluminescence measurement.

7. The thermoplastic resin composition according to claim 1, wherein the HALS-based UV stabilizer and the benzotriazole-based UV stabilizer are present in a weight ratio (HALS-based UV stabilizer:benzotriazole-based UV stabilizer) of about 1:0.5 to about 1:1.1.

8. The thermoplastic resin composition according to claim 1, wherein the UV stabilizer and the zinc oxide are present in a weight ratio (UV stabilizer:zinc oxide) of about 1:0.5 to about 1:10.

9. The thermoplastic resin composition according to claim 1, wherein the thermoplastic resin composition has a color variation ($\Delta E$) of about 0.5 to about 2.5, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after testing for 3,000 hours in accordance with ASTM D4459:

$$\text{Color variation } (\Delta E) = \sqrt{(\Delta L^*)^2 + (\Delta a^*)^2 + (\Delta b^*)^2} \quad \text{[Equation 2]}$$

where $\Delta L^*$ is a difference ($L_1^* - L_0^*$) between L* values before and after testing, $\Delta a^*$ is a difference ($a_1^* - a_0^*$) between a* values before and after testing, and $\Delta b^*$ is a difference ($b_1^* - b_0^*$) between b* values before and after testing.

10. The thermoplastic resin composition according to claim 1, wherein the thermoplastic resin composition has an antibacterial activity of about 2 to about 7 against *Staphylococcus aureus* and an antibacterial activity of about 2 to about 7 against *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

11. A molded article formed of the thermoplastic resin composition according to claim 1.

12. The thermoplastic resin composition according to claim 1, wherein the zinc oxide has a peak intensity ratio (B/A) of about 0.1 to about 1, where A indicates a peak in the wavelength range of 370 nm to 390 nm and B indicates a peak in the wavelength range of 450 nm to 600 nm in photoluminescence measurement.

* * * * *